Aug. 17, 1965   J. E. SMITH ETAL   3,201,625
DYNAMOELECTRIC MACHINES
Filed March 30, 1961   2 Sheets-Sheet 1

Fig. I.

WITNESSES
Wm. B. Sellers.
James F. Young

INVENTORS
James E. Smith, Peter J. Sweeny,
and Richard M. Miller.
BY E. H. Liss
ATTORNEY

United States Patent Office 3,201,625
Patented Aug. 17, 1965

3,201,625
DYNAMOELECTRIC MACHINES
James E. Smith, Tonawanda, and Peter J. Sweeny, Bowmansville, N.Y., and Richard M. Miller, Little Silver, N.J., assignors to Westinghouse Electric Corporation, East Pittsburgh, Pa., a corporation of Pennsylvania
Filed Mar. 30, 1961, Ser. No. 99,602
6 Claims. (Cl. 310—154)

This invention relates to dynamoelectric machines and, more particularly, to improvements in the field structure of dynamoelectric machines.

The present design of direct current rotating machinery employing electromagnetic fields comprising relatively soft iron poles and field coils requires complex controls to prevent excessive overspeed due to field excitation loss in shunt machines and loss of load in series wound machines. These controls include shunt field loss relays, nonlinear field discharge resistors and shunt field cables. The use of permanent magnet poles overcomes some of these problems but conventional permanent magnet excited machines have disadvantages which detract from their practicability. The effect of the current carrying armature conductor reduces the excitation flux permanently. In direct current motors this effect is accumulative and destructive and the loss of excitation increases armature current which in turn further reduces the excitation flux.

In machines utilizing a complete permanent magnet main pole, the permanent magnets must be wider than a standard pole to obtain the same number of lines of flux as an electromagnet main pole. The main pole faces of a conventional four pole direct current machine cover approximately 65% of the armature circumference, the remaining 35% of the armature circumference being used to commutate the machine. Thus, conventional designs in permanent magnet machines do not provide a sufficient commutating zone to commutate the machine properly. Excessive brush sparking occurs. If, however, the magnets were made narrower to obtain a good commutation zone, the amount of flux supplied by the permanent magnets would be only 75 to 80% of the flux provided by standard electromagnetic poles.

It is therefore apparent that although a permanent magnet field structure has certain advantages in manufacturing economy and simplicity, present designs are not satisfactory for heavy duty application.

The principal object of the present invention is to provide a new and improved field structure for dynamoelectric machines, which eliminates the need for complex controls and field leads.

Another object of the invention is to provide a new and improved permanent magnet excited field structure which is simple and economical to manufacture and which performs in a manner comparable to coil excited field structures.

A further object of the invention is to provide a new and improved permanent magnet excited field structure which overcomes the destructive effects of current carrying armature conductors.

A still further and more specific object of the invention is to provide a new and improved permanent magnet excited field structure which overcomes the destructive effect of current carrying armature conductors on the permanent magnet field and which provides a proper commutating zone.

The present invention accomplishes these and other objects by providing salient poles for the field structure of a dynamoelectric machine which include a permanent magnet in the shank portion and a pole tip of high permeability material such as soft iron, for example. The pole may include coil excitation in addition, if desired.

The pole tips may be shaped for the purpose of concentrating flux on the pole tip face and for providing a proper commutating zone. Flux leakage shielding may be employed on the combination pole to reduce flux leakage and to improve commutation.

Other objects of the invention will be apparent from the following detailed description, taken in connection with the accompanying drawings, in which.

The illustrated machine is a commutator machine which for convenience in discussion will be referred to as a direct current motor with the understanding that the invention is not necessarily limited to a motor but may include generators or any type of dynamoelectric machine using a salient-pole field structure.

Figure 1:
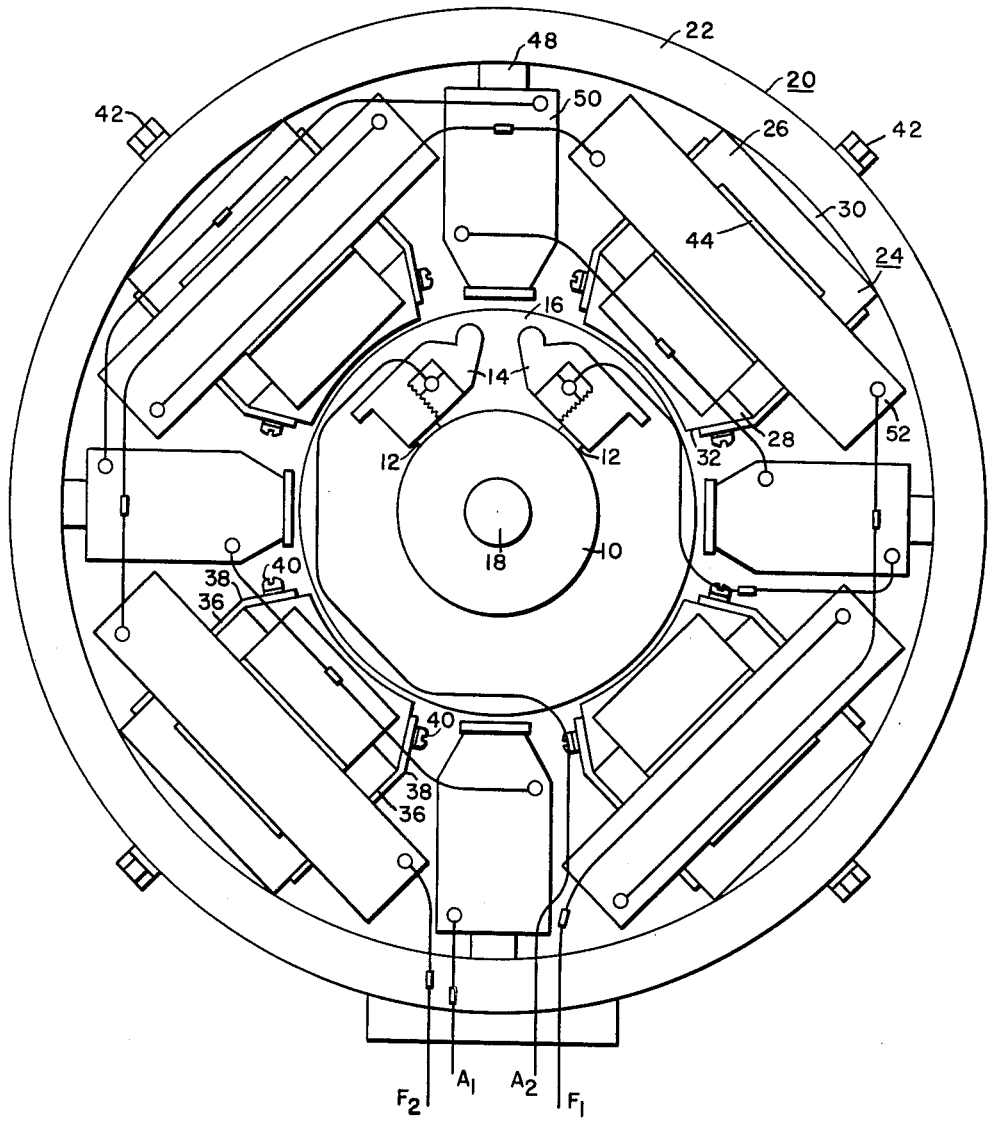
FIGURE 1 is a sectional view of the motor illustrating one embodiment of the invention.

The machine shown in FIG. 1 comprises a commutator which includes a cylindrical current collecting device 10 of any suitable type or construction and brushes 12 supported in brushholders 14. An armature 16 is mounted on shaft 18. The field structure or stator member 20 comprises a yoke 22 and a plurality of salient-pole structures 24 (FIGS. 1 and 2), each salient-pole structure comprising a shank portion 26, a pole tip portion 28 and a filler piece 30.

The shank portion 26 is formed of permanent magnet material such as, for example, an alloy composed of aluminum, nickel, cobalt and iron. This alloy is mentioned by way of illustration only and it will be understood that any suitable permanent magnet material having high residual flux and high retentivity may be used. The magnet material for the shank portion 26 may be sintered, cast, or made by any other suitable means.

The pole tip section 28 may be of any suitable flux carrying material having high permeability relative to the permanent magnet shank portion 26. The pole tip portions 28 may have their side edges 32 beveled.

Since permanent magnet material is extremely hard, brittle and difficult to machine, filler pieces 30 of softer flux carrying material are employed between the magnetic shank 26 and the yoke 22. These filler pieces can be machined to conform to the curvature of the yoke 22. It will be understood of course that although use of the filler piece 30 is preferred, it may be omitted. In many cases, however, it is more economical to machine a filler piece from iron or steel than it is to grind a curvature on the magnet because of the extreme hardness and brittleness of permanent magnet materials.

The use of flux carrying tapered pole tips 28 is effective to space the permanent magnet material from the immediate area of the current carrying conductors on the armature. The pole tip sections reduce the demagnetizing effect which tends to reduce the flux of the permanent magnet material. In addition, the beveled edges provide a shaped pole tip which serves the purpose of concentrating the flux on the pole face. The armature can then be worked at a higher degree of efficiency and an improved rating may be obtained from the machine. A further advantage of the shaped pole tip 28 is to create a proper commutating zone with or without the use of conventional commutating poles. If permanent magnet tapered pole tips were used, the tapered magnets would have a high value of leakage flux. Spray of leakage flux decreases the armature commutation zone and poor commutation results. Increasing the main pole-face flux density with the use of the tapered magnetic pole tip 28 allows a permanent magnet motor to compete with the standard electromagnetic motor in rating and performance. This has not been done in previous attempts to build permanent magnet motors.

To further reduce the flux leakage from the combination pole 24 and to improve commutation, a flux leakage shield 36 is employed which extends over the entire longitudinal side of the pole, the entire radial length of the pole tip, and extends a substantial distance along the permanent magnet shank portion 26. The flux shield 36 is creased as at 38 to conform to the shape of the pole structure. The flux leakage shield 36 is secured to the pole structure by any suitable means as for example by a bolt 40 extending into the beveled edge of the pole tip. Since the permanent magnet for a complete permanent magnet main pole must be wider than the standard main pole to obtain the same number of lines of flux as the electromagnet main pole, the use of a beveled edge on the pole tip portion allows the flux density to be increased as the flux flows from the wider magnet area to the smaller pole face area due to the taper of the pole tip.

The main pole faces of a standard four pole direct current machine cover approximately 65% of the armature circumference. The remaining 35% of the armature circumference is used to commutate the machine. If magnets were used to replace the electromagnetic poles, without using the taper pole tips, the wider magnets would cover approximately 85% of the armature circumference. The remaining armature circumference would be too small to commutate the machine without excessive brush sparking. If the magnets were made narrower to obtain a proper commutation zone, the amount of flux applied by the magnet would be only 75 to 80% as against the standard electromagnetic poles. Since soft iron or steel or other high permeability material pole tips can accommodate a much higher flux density than permanent magnet materials at lower saturation, the tapered pole tip can increase the pole face flux density to the same level as a comparable electromagnetic pole. Any material which can carry a relatively high flux density relative to permanent magnet materials are suitable for pole tips.

The field pole structure 24 including the filler piece 30, the magnetic shank portion 26 and the pole tips 28 is held in position on the frame 22 by bolts 42 which extend radially through the yoke 22 and the filler piece 30, the permanent magnet shank portion 26 and into the pole tip portion 28. Any other suitable means may be employed for securing the salient field poles to the yoke 22. Each of the main poles 24 include a coil hanger 44 secured to the front and rear faces of the poles. Secured to the yoke 22 intermediate the main field poles 24 are a plurality of commutating poles 48 having commutating windings 50 thereon. The commutating windings 50 are connected in series with the armature circuit which in turn is connected to the terminal leads A1 and A2. The main poles 24 are provided with main field windings 52 which are supported on each pole by coil hangers 44. The main field winding leads are brought out to terminals at F1 and F2 and are excited from a suitable excitation source (not shown).

In the modification shown in FIGURE 1, the excitation coil will be used only to energize or to demagnetize the magnets so that the armature can be installed or removed from the machine.

Figure 2:
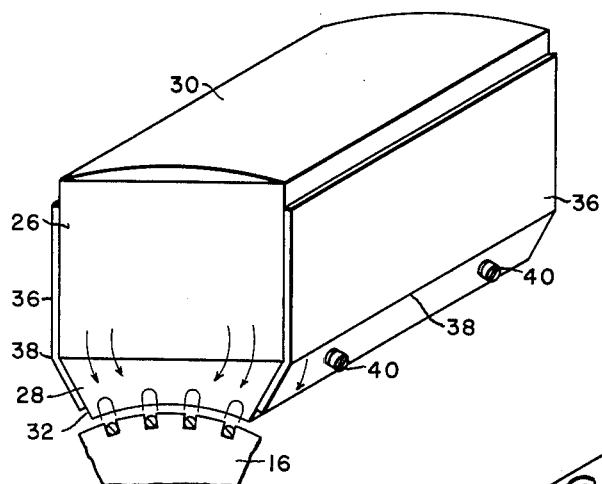
FIGURE 2 is a perspective view of a pole employed in the embodiment illustrated in FIGURE 1.

The machine hereinabove described and illustrated in FIGURES 1 and 2 eliminates much complex and expensive control equipment by utilizing permanent magnet poles. The destructive demagnetizing effect of current carrying armature conductors is controlled and minimized by the high permeability pole tip sections 28 and magnet stability is increased. It can be seen that the cross magnetizing flux due to armature current circulates in the flux carrying pole tip and does not reach the permanent magnet section of the pole. The main exciting flux of the permanent magnet material is concentrated by the pole tip on the armature which enables the armature to be worked at a higher degree of efficiency. The leakage flux from the pole piece is deflected back toward the main exciting flux on the armature by the flux carrying shield 36. Tapered pole tips 28 provide space for a proper commutating zone.

Figure 3:
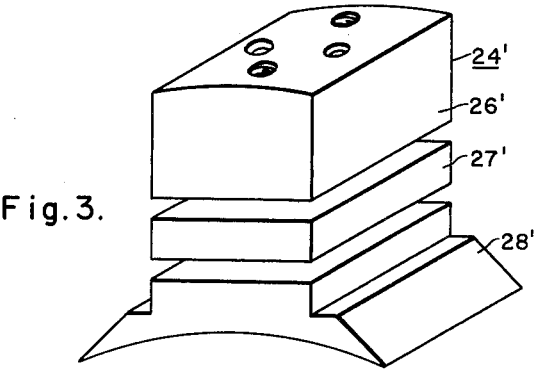
FIGURE 3 is a perspective view of a pole employed in another embodiment of this invention.
Figure 4:
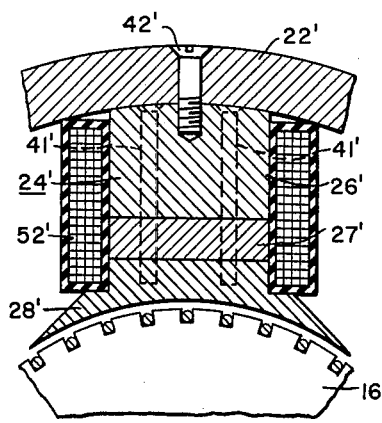
FIGURE 4 is a partial sectional view of a motor illustrating the embodiment shown in FIG. 3.

In FIGURES 3 and 4 there is illustrated a modification of the pole employed in the permanent magnet machine of this invention. The modification illustrated in FIGURE 3, contemplates the use of a standard series connected or shunt connected field. A permanent magnet insert is provided in the flux carrying pole shank to provide an overspeed device with standard shunt connected direct current motors and light compound connected motors. This also provides protection for light loading in series connected motors. The embodiment illustrated in FIG. 3 is identical to the embodiment of FIG. 2 except for the construction of the main field pole and the main field winding.

The pole 24' includes a shank portion 26' and a pole tip portion 28'. The shank portion 26' is of high permeability flux carrying material which may be relatively soft iron or other suitable material.

Included in the pole shank portion 26' is a permanent magnet insert 27' which may be located intermediate the shank portion 26' and the pole tip portion 28'. The permanent magnet insert 27' is of low permeability, high retentivity permanent magnet material similar to the material used in the shank portion 26 of the pole illustrated in FIGURE 1.

The pole tip portion 28' is of conventional shape and construction and of material suitable for pole tips such as soft iron or steel having high permeability. The pole is secured together by rivets 41' or any other suitable means. The entire combination pole is secured to the frame 22' of the dynamoelectric machine by bolts 42' or any other suitable means.

A main excitation coil 52' is supported on each pole. The coils 52' may be connected in series with the armature winding or may be a shunt connection across the voltage supply source. The pole tip section or portion 28' of the pole serves to prevent demagnetization of the permanent magnet insert 27'.

Should the shunt field of a shunt wound motor be lost, the permanent magnet insert 27' would provide sufficiently high residual flux to prevent self-destruction of the motor due to excessive speed. This insert 27' eliminates expensive and complex control components such as shunt field loss relays.

The permanent magnet insert 27' is also useful in protecting a series wound direct current motor from overspeed due to loss of load. The relation between speed and armature current is represented by the equation $$R.p.m. = k \frac{(E_a - I_a R_a)}{\phi}$$

where $E_a$ is the applied voltage, $I_a$ is the armature current in amperes, $R_a$ is the combined resistance of the armature, series field coils and interpole coils, $k$ is a constant, and $\phi$ is the flux. In the case of the series motor, the applied voltage $E_a$ is constant, while the flux per pole varies with $I_a$. Therefore, as the load and thus the armature current decrease, the flux per pole decreases and the machine will speed up to give the required back E.M.F. At light loads, the speed becomes dangerously high and for this reason a series motor must always be geared or directly connected to the load. The permanent magnet insert maintains a constant minimum flux per pole thereby preventing overspeed and permitting the motor to be belt connected to the load. As in the FIGURE 1 embodiment, the pole tip 28' serves to prevent demagnetization of the permanent magnet since the cross magnetizing armature flux circulates in the flux carrying pole tip and does not reach the permanent magnet pole piece.

It will apparent that there has been disclosed a dynamoelectric machine in which a combination of permanent magnet and soft iron or other suitable flux carrying materials have been employed in the field pole structure to provide a permanent magnet machine which is not subject to demagnetization. This pole construction is also advantageous in protection of series and shunt wound motors against excess motor speed due to loss of load or loss of field, respectively. It will also be apparent that by using permanent magnet poles a field coil may be eliminated entirely thereby eliminating shunt leads and other controls. It will also be understood that the permanent magnet field structure herein disclosed can be used in other types of dynamoelectric machines as for example constant potential generators.

While there has been shown and described certain preferred embodiments of the invention, modifications thereto will readily occur to those skilled in the art. For example, the permanent magnet insert of the modification shown in FIGURES 3 and 4 may be disposed intermediate the sides or between the front and rear faces of the shank portion of the pole; or a cylindrical insert may be embedded in the shank portion of the pole. Also, other shapes of pole tip portions may be employed. Thus the invention is not limited to the specific arrangement shown and described but it is intended to include all modifications which fall within the spirit and scope of the invention.

We claim as our invention:

1. A dynamoelectric machine having a rotatable armature and a stationary field structure, the field structure having a plurality of salient pole members thereon, each of said pole members including a permanent magnet portion and a pole tip portion adjacent the armature, the longitudinal sides of said pole tip portion tapering inward toward the armature so that the width of the pole tip portion circumferentially of the armature is less than the width of the permanent magnet portion.

2. A dynamoelectric machine having a rotatable armature and a stationary field structure, the field structure having a plurality of salient pole members thereon, each of said pole members including a permanent magnet portion and a pole tip portion adjacent the armature, said pole tip portion having high permeability relative to the permanent magnet portion and the longitudinal sides of the pole tip portion tapering inward toward the armature so that the width of the pole tip portion circumferentially of the armature is less than the width of the permanent magnet portion.

3. A dynamoelectric machine having a rotatable armature and a stationary field structure, the field structure having a plurality of salient pole members thereon, each of said pole members including a permanent magnet portion and a pole tip portion, said pole tip portion adjoining the permanent magnet portion and extending toward the armature, the pole tip portion being of substantially the same width as the permanent magnet portion at the adjoining surfaces and the longitudinal sides of the pole tip portion tapering radially inward so that the pole tip portion has a smaller circumferential width at the end adjacent the armature.

4. A dynamoelectric machine having a rotatable armature and a stationary field structure, the field structure having a plurality of salient pole members thereon, each of said pole members including a permanent magnet portion and a pole tip portion, said pole tip portion consisting of magnetic material of higher permeability than the permanent magnet portion, said pole tip portion adjoining the permanent magnet portion and extending toward the armature, the pole tip portion being of substantially the same width as the permanent magnet portion at the adjoining surfaces and the longitudinal sides of the pole tip portion tapering radially inward so that the pole tip portion has a circumferential width at the end adjacent the armature.

5. A dynamoelectric machine having an armature and a field structure, the field structure having a plurality of salient pole members thereon, each of said pole members including a permanent magnet portion and a pole tip portion adjacent the armature, said pole tip portion having high permeability relative to the permanent magnet portion and tapering inward toward the armature, and a magnetic shield member on each side of the pole member extending over at least a substantial part of the longitudinal sides of the permanent magnet portion and the pole tip portion.

6. A dynamoelectric machine having an armature and a field structure, the field structure having a plurality of salient pole members thereon, each of said pole members including a permanent magnet portion and a pole tip portion adjacent the armature, said pole tip portion having high permeability relative to the permanent magnet portion and tapering inward toward the armature, and a magnetic shield member on each side of the pole member extending over the longitudinal side of the pole member and covering at least a substantial part of the side surface of the permanent magnet portion and the side surface of the pole tip portion.

References Cited by the Examiner

UNITED STATES PATENTS

| 310,763 | 1/85 | Weston | 310—181 X |
| 1,962,691 | 6/34 | Landis | 310—190 X |
| 2,482,875 | 9/49 | Sawyer | 310—181 X |
| 2,556,004 | 6/51 | Sachse | 310—152 X |

FOREIGN PATENTS

| 1,015,911 | 9/57 | Germany. |
| 1,030,434 | 5/58 | Germany. |
| 216,281 | 5/24 | Great Britain. |

MILTON O. HIRSHFIELD, *Primary Examiner.*

DAVID X. SLINEY, *Examiner.*